(No Model.)

6 Sheets—Sheet 1.

H. CASEBOLT.
UNDERGROUND CABLE WAY.

No. 256,881. Patented Apr. 25, 1882.

Witnesses:
Walter Fowler,
R. K. Evans

Inventor
Henry Casebolt
by A. N. Evans & Co
Attys.

(No Model.) 6 Sheets—Sheet 2.
H. CASEBOLT.
UNDERGROUND CABLE WAY.
No. 256,881. Patented Apr. 25, 1882.
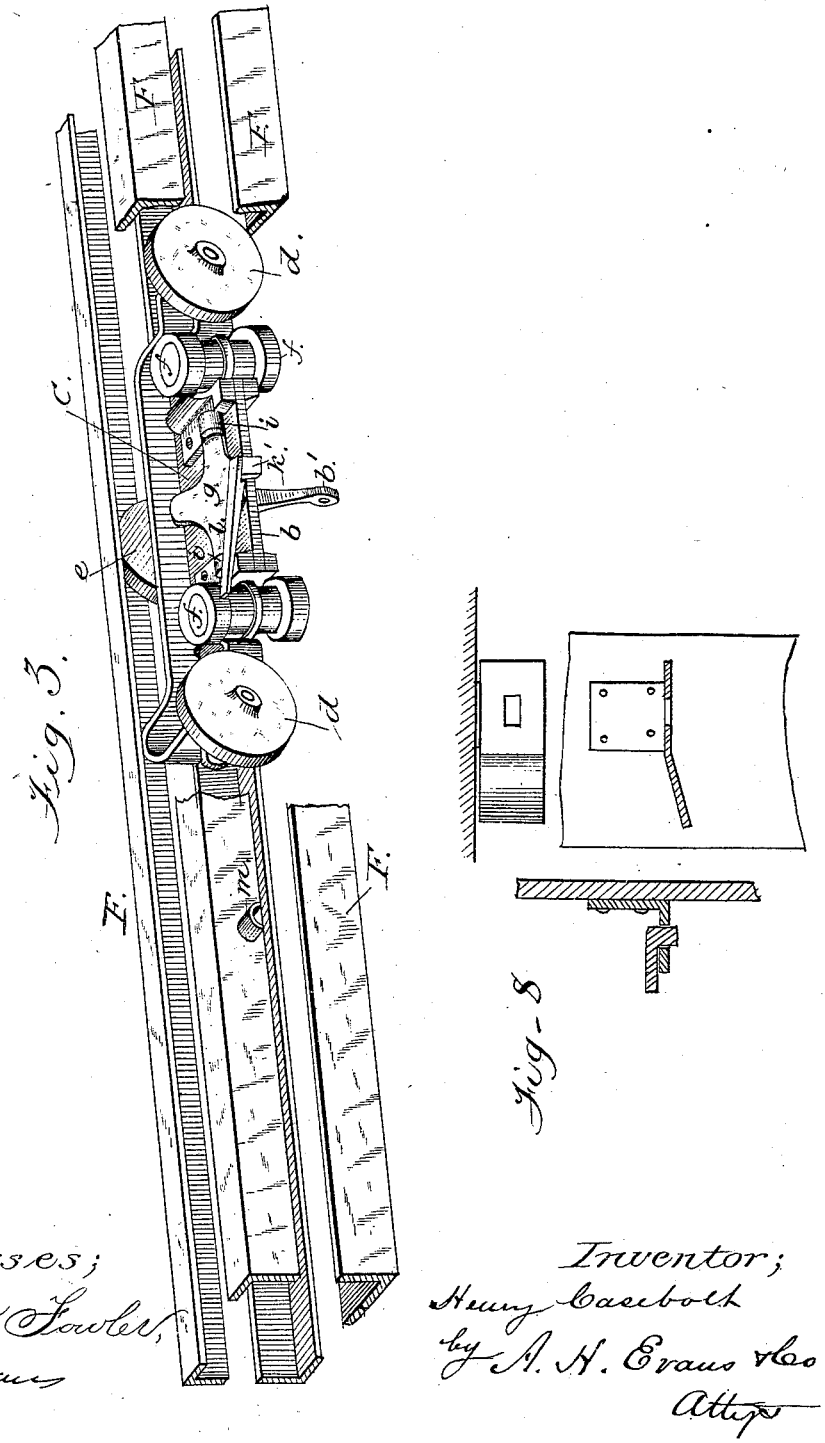

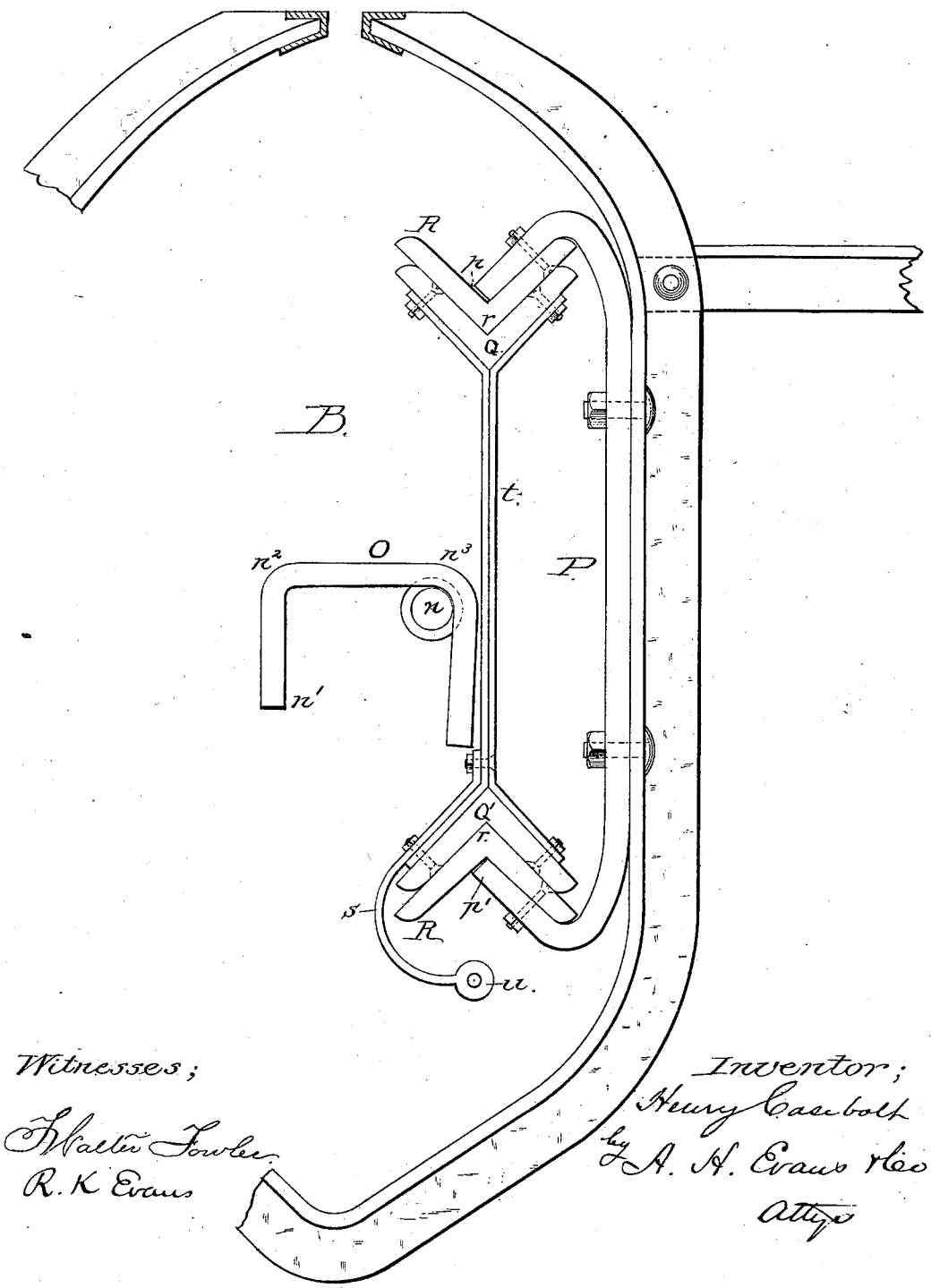

(No Model.) 6 Sheets—Sheet 4.
H. CASEBOLT.
UNDERGROUND CABLE WAY.
No. 256,881. Patented Apr. 25, 1882.
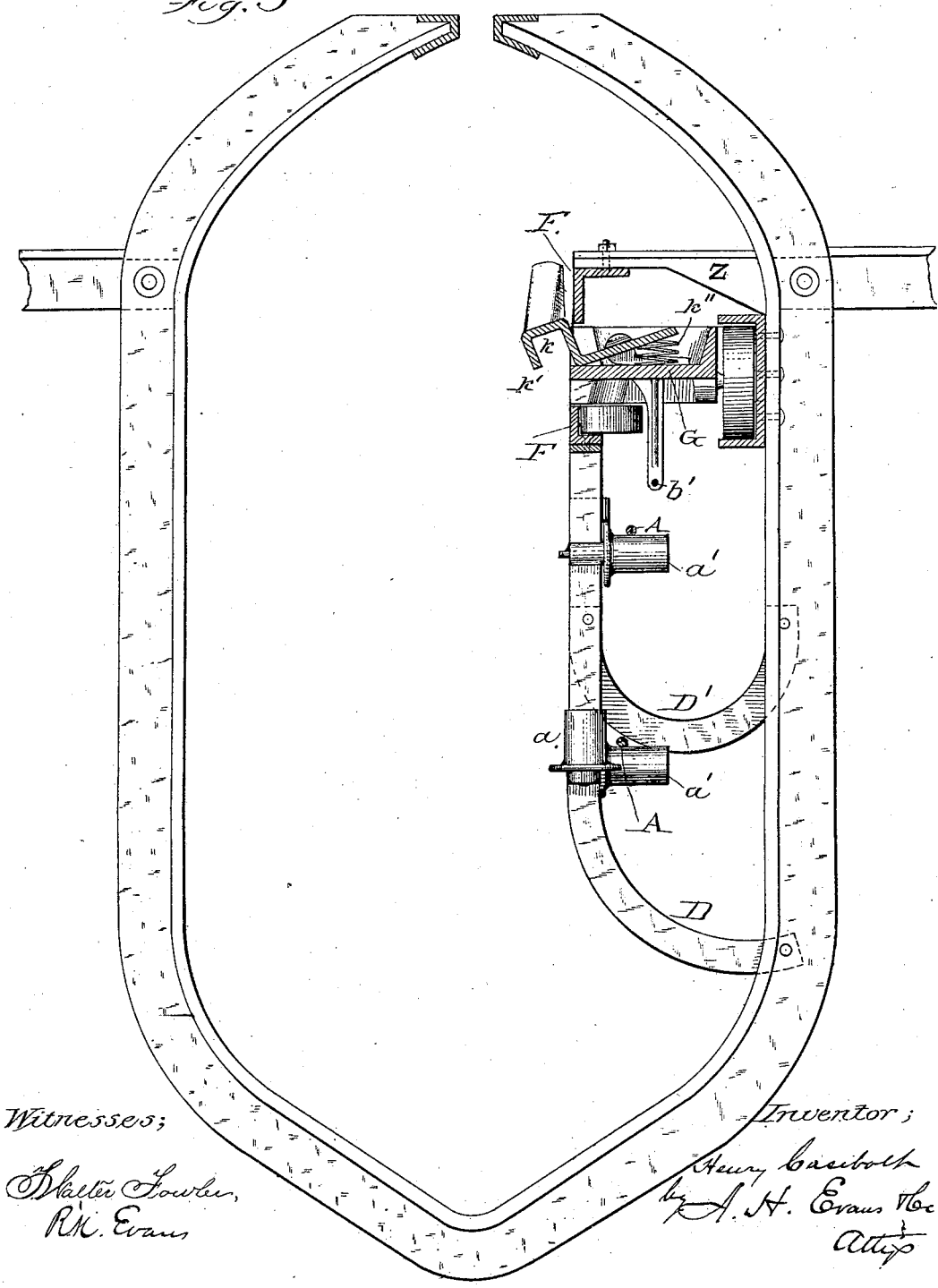

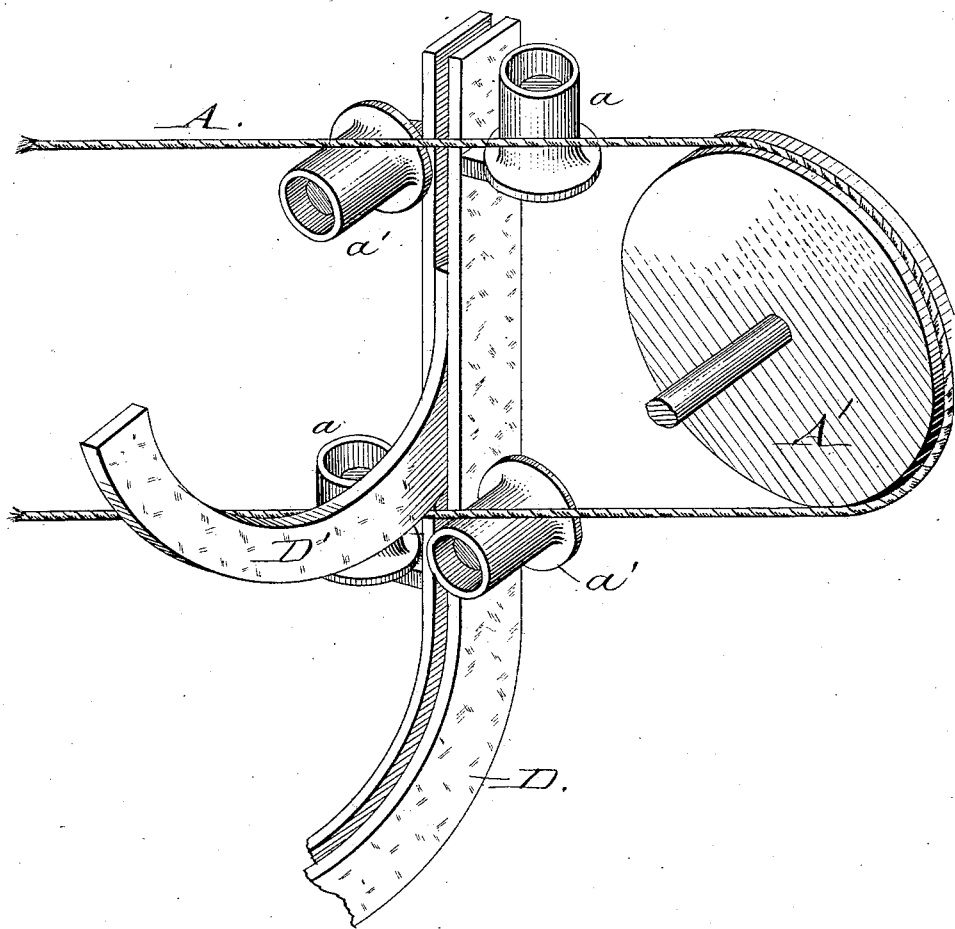

(No Model.) 6 Sheets—Sheet 6.
H. CASEBOLT.
UNDERGROUND CABLE WAY.
No. 256,881. Patented Apr. 25, 1882.
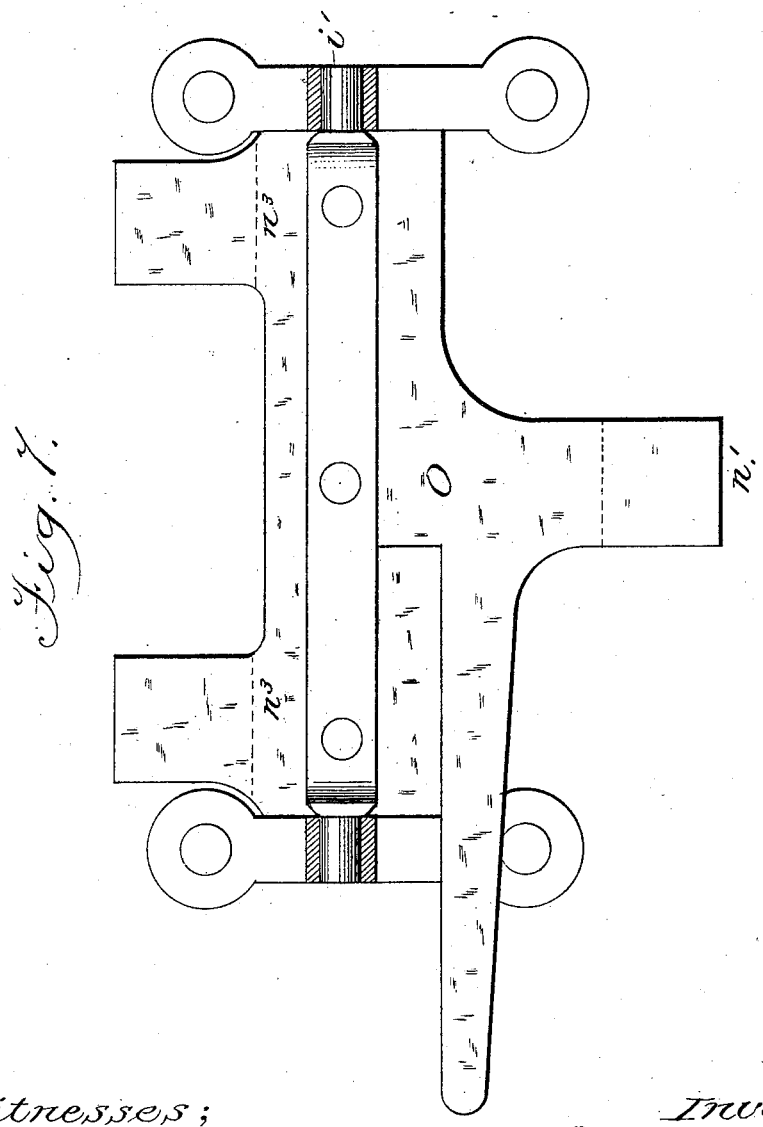

UNITED STATES PATENT OFFICE.

HENRY CASEBOLT, OF SAN FRANCISCO, CALIFORNIA.

UNDERGROUND CABLE-WAY.

SPECIFICATION forming part of Letters Patent No. 256,881, dated April 25, 1882.

Application filed January 17, 1882. (No model.)

*To all whom it may concern:*

Be it known that I, HENRY CASEBOLT, of San Francisco, in the State of California, have invented certain Improvements in Underground Cable-Ways; and I hereby declare the following to be a full, clear, and exact description thereof, reference being had to the accompanying drawings, making part of this specification, in which—

Figure 1:
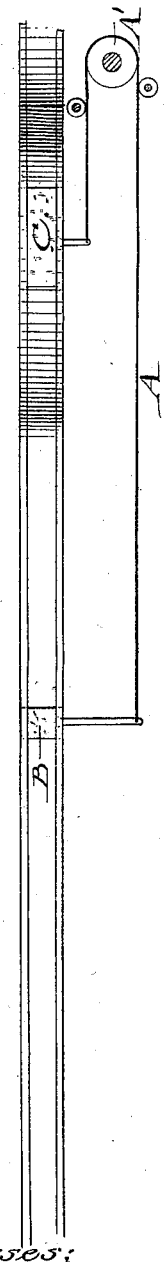
Figure 2:
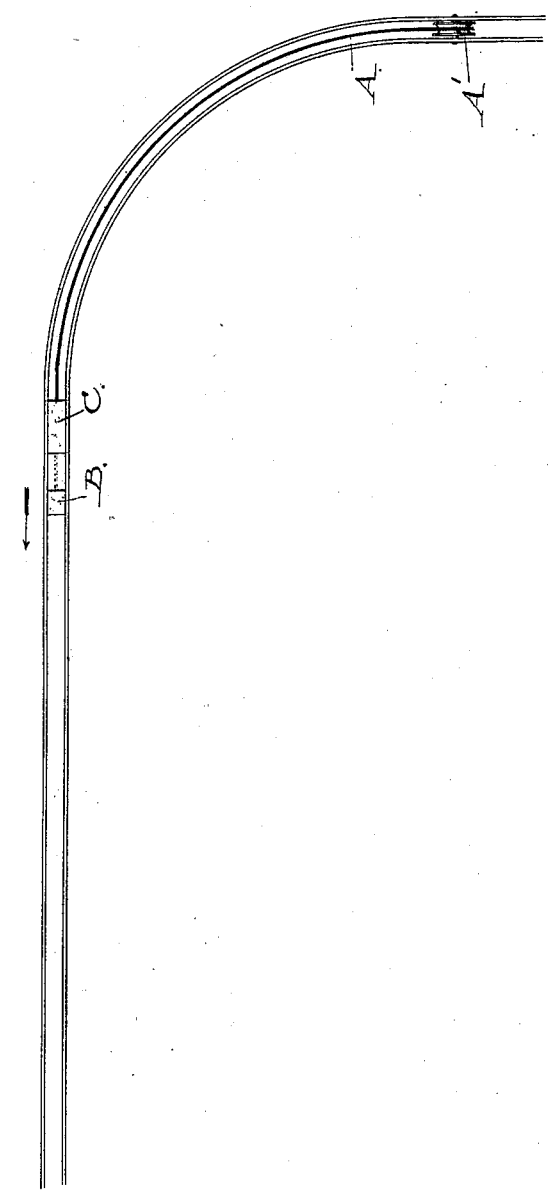

Figures 1 and 2 are views showing in elevation and plan the general construction of the apparatus. Fig. 3 is an isometric perspective view of the carriage for conducting the grip around a curve. Fig. 4 is a vertical sectional view through the supplemental carriage by which the grip-carrying carriage is returned to position. Fig. 5 is a vertical cross-section through the tunnel and the grip-carrying carriage, and showing the rollers and supporting-brackets which sustain the rope which connects the main carriage with the supplemental carriage. Fig. 6 is an enlarged view of the supporting-bracket with its rollers and the sheave over which the rope returns. Fig. 7 is an enlarged view of the engaging-latch on the supplemental carriage before the bends are made in the plate. Fig. 8 illustrates a portion of the grip and the attached plate for engaging the latches.

My invention relates to underground endless cable-ways, and especially to means for passing the cars around curves, and is an improvement on Letters Patent of the United States granted to me April 5, 1881, and numbered 239,726.

My invention consists in the combination, in a single tunnel, of a main conducting-carriage for the grip with a supplemental carriage which replaces the conducting-carriage in a proper position to be engaged by the next following car.

My invention also consists in the details of construction of the main grip-conducting carriage and its ways.

My invention also consists in an improved engaging-latch carried by the carriage aforesaid to connect it with the grip.

My invention also consists in an improved bracket for supporting the main conducting-carriage and its ways and the guiding-rolls for the carriage-conducting rope.

My invention also consists in the details of construction of the supplemental or returning carriage and its ways.

In the patent hereinbefore mentioned as issued to me mechanical appliances were provided whereby in a double-track road cars passing curves utilized two grip-conducting carriages, which were so connected that a car passing the curve on one track utilized one carriage while it drew the other carriage beneath the adjacent track into a position to be utilized by the next car passing in an opposite direction. Experience demonstrated that a number of cars might need to pass the curve on one track before a car would pass the curve on the adjacent track, and consequently it would not do to rely upon the car on one track replacing the conducting-carriage upon the adjacent track. Hence the necessity to make each carriage in adjacent tracks operate independently, and this I accomplish by my invention.

In order that those skilled in the art may make and use my invention, I will proceed to describe the manner in which I have carried it out.

In the said drawings the diagrams shown in Figs. 1 and 2 illustrate the curvature of the tunnel and its projection in a straight line, and within which on ways slide a grip-conducting carriage, C, and a supplemental returning-carriage, B, each attached to one end of rope, cord, or wire A, which passes around a sheave, A'. As a car passes upon the curve the grip is seized and retained by carriage C, and as the car passes with it, the rope A, passing over sheave A', draws on the returning-carriage B located within the straight portion of the track, and said carriage B advances to meet carriage C at the end of the curved portion when the carriage C is automatically released from the grip. The grip immediately seizes carriage B and carries it back down the straight portion of the track, thereby making carriage C recede to the beginning of the curve and ready to be caught by the grip of the car next following. When the two carriages have reached these positions carriage B is automatically released from the grip and the car proceeds on down the line.

The mechanism and construction whereby I accomplish the above-named operation are as follows: In the curvilinear portion of the track are a series of curved double brackets, D D', on the upper ends of which is supported one of two angle-iron ways, F, the other angle-iron way being supported from projecting bars Z, for receiving and directing a latch-carrying carriage, G, (see Fig. 3,) and at desirable points the aforesaid brackets also support guiding-rolls $a$ $a'$, for supporting and guiding the rope or cord A, hereinbefore mentioned. The length of the ways F equals the length of the curved portion, the brackets being supported on every yoke or each alternate yoke, as may be deemed desirable.

The main grip-conducting carriage carrying the latch is constructed of a plate, $b$, having a downwardly-projecting arm, $b'$, to which is secured one end of rope A, and is provided with rollers $d$ $d$ $e$, bearing vertically in the angle-iron ways, and rollers $f f$, bearing against the vertical faces of the angle-iron ways. These various bearings of the rollers prevent all rattle of the carriage and render its travel smooth and certain. On the top of plate $b$ is a latch, $g$, pivoted at $i$ $i$, and provided with an arm, $k$, which projects out into the tunnel toward the line of travel of the grip, and the end $k'$ of this arm is bent down to form a stud to engage with the socket on the grip. (See Fig. 8.) Beneath the side of the latch opposite the arm $k$ is a coiled spring, $k''$, which keeps said arm depressed until it comes in contact with and is raised by the engaging-socket on the grip. When the grip has carried the conducting-carriage to its extreme necessary point of travel, a projection or arm, $l$, arranged diagonally from the latch, strikes against a projection, $m$, fixed to the ways F, which forces said arm $l$ upward, and the latch is lifted from the grip-socket, and the main carriage is left at the extreme end of the curve in the direction in which the car is traveling, and meantime supplemental carriage B has been brought to a point contiguous to the main carriage, and at the juncture of the curve with the straight portion of the track. (See Fig. 2.) The grip immediately after being released from carriage C has its socket or a diagonal face on the same come in contact with a gravity-latch, O, swung on a pivot, $n$, attached to the supplemental carriage B, and said latch rides up on the grip-socket, and the end $n'$ drops into it, thereby securing the grip to carriage B, and as the car travels down the track the grip carries said supplemental carriage, which in turn, through the means of cord or rope A, passing over sheave A', drags carriage C back to the beginning of the curve, to be picked up by the following car, which repeats the operation described.

The supplemental carriage B and operating and supporting mechanism are constructed as follows: At intervals along the tunnel there are bolted to the yokes bars P, having their upper and lower ends bent outward and downward, as seen at $p$ $p'$, to support angle-iron ways R R, the apices $r$ of the angle-iron being on a central vertical line and facing each other. A vertically-arranged carriage, B, is provided at its ends with V-shaped angle-iron bearings Q Q', which fit over the angle-iron ways R R and slide thereon. Near the center of the body $t$ of this supplemental carriage is secured a horizontal pivotal bar or rod, $n$, which is a bearing for a latch made by bending an iron bar at $n^2$ $n^3$, and attaching it to pivotal bar $n$ in the angle formed by the bend $n^3$, the downwardly-projecting portion of the latch from bend $n^3$ being so much longer than the downwardly-projecting portion from bend $n^2$ that the excess of weight due to the greater length will cause the outer end of the latch $n'$ to remain normally in the position seen in Fig. 4, and when the outer end, $n'$, is raised by any agency the moment the force exerted to raise it is removed it will drop by gravity until the longer downwardly-projecting arm of the latch will rest against the body $t$ of the carriage B. Bolted to the lower V-shaped bearing on its outer side next to the cable is a bar, $s$, projecting downward and curved so as to come beneath the center of carriage B, where it is provided with an eye, $u$, intended to receive one end of the rope A. (See diagram, Fig. 1.) The carriage B is made of such a vertical length that there will be no checking of its travel by a tendency to bind by tipping in the ways R R.

As the carriages C and B must be made to travel the same distance, the ways F F and R R must extend at least equal distances within the tunnel, and the carriages are made of such vertical dimensions that the points of attachment of the ends of rope A to said carriages shall be in a horizontal line with the points of contact of the rope with the sheave A', so that the pull may be as direct as possible.

Throughout this specification and accompanying drawings I have illustrated and contemplated using a construction of tunnel described and illustrated in a patent issued to me November 8, 1881, and numbered 249,300, being part of a system of construction for cable-railroads devised by me.

Having thus described my invention, what I claim as new, and desire to secure by Letters Patent, is—

1. In a device for turning curves of endless cable-ways, the combination, in one tunnel, of a main grip-conveying carriage, a supplemental returning-carriage, and a connecting-rope, substantially as and for the purpose described.

2. The carriage C, provided with the rollers $d$, $d$, $e$, and $f$, and a spring-latch carrying a diagonal bar or rod, $l$, in combination with the angle-iron ways F and stud $m$, substantially as and for the purpose set forth.

3. The latch $g$, made from a flat blank, with its engaging end struck down at $k'$, and provided with trunnions or pivots $i$ $i$, in combination with the plate G of the carriage and spring $k''$, all constructed and arranged as described.

4. In combination with the carriage-ways F, the bracket consisting of the double-curved bars D and the single intervening curved bar D', for the purpose specified.

5. The supplemental or returning carriage consisting of the body $t$, provided at its ends with V-shaped angle-iron sockets and the latch O near its center, in combination with the bars P and the V-shaped angle-iron ways R R, for the purpose set forth.

6. The gravity-latch O, made of a metal plate, having projections bent downward at $n^2$ $n^3$, and pivoted to the carriage, for the purpose specified.

HENRY CASEBOLT.

Witnesses:
R. K. EVANS,
WARREN PARSONS.